Patented July 29, 1930

1,771,479

UNITED STATES PATENT OFFICE

WILLIAM H. ALTON, OF NEW YORK, N. Y., ASSIGNOR TO R. T. VANDERBILT COMPANY, INCORPORATED, OF NEW YORK, N. Y., A CORPORATION OF NEW YORK

TREATMENT OF CLAY

No Drawing.       Application filed August 22, 1928.   Serial No. 301,433.

This invention relates to the treatment of clay, and more particularly to the separation of clay from grit to produce a substantially grit-free clay product.

In the usual deposits of secondary clays of the kaolin type, especially those most common to the States of North and South Carolina and of Georgia, the gritty matter with which they are combined is found in the form of small quartz particles together with flakes of mica, both of which have to be removed before the clay can be used in the manufacture of paper, etc., because, no matter how finely the grit may be ground by machinery, into the body of the clay, the quartz always remains as a microscopic grit to weaken the fabric, and the mica shows in the finished product as a shining speck or is liable to drop out of the paper or a film, leaving tiny holes.

The method commonly employed heretofore for treating clay to separate grit from it has been that of agitating the clay in the presence of enough water to soften it to a point where it will disintegrate, using usually around nine times as much water as clay. After the clay has been softened so as to set free the particles of grit to which they have been adhering, the thin slurry of clay is passed through a series of troughs with cleats across the bottom or pockets called "riffles" in which the particles of grit are caught, due to their greater specific gravity, while the clay itself goes over the riffles and is collected in vats or tanks and allowed to settle. The water is then siphoned off, leaving a layer of clay mud which requires several days or even weeks to sufficiently evaporate for handling in a dry house where it is further dried and then packaged for delivery to the consumer. While this wet method of washing clay to free it from grit is adequate, it is wasteful and expensive, and requires the drying out of a large amount of water with artificial heat.

According to the present invention, the clay with its fine grit particles in it is treated in a dry way without the necessity of using a large amount of water, and of removing the added water from the clay.

According to the present invention, the large lumps of clay mined from the clay bed are first allowed to air dry for several days in a "dry shed." These lumps are then subjected to a preliminary rough crushing or grinding to reduce them to a size varying from pellets of around one-quarter inch diameter down to powder. This can be accomplished by passing the lumps through an appropriate type of crushing device, such as the Arnold Creger heavy duty clay crusher. The resulting mixture of fine clay and pellets of up to one-quarter inch diameter is then passed through a rotary drier or other form of drying device to reduce the moisture content down to less than 3%. The clay thus dried contains a large part of the clay in the form of fine particles which can be directly separated from the clay by a selective air separation treatment such as that set forth in my companion application, Serial No. 295,125. In such case, however, the clay which is not in a finely divided state requires further crushing to separate the clay from the grit.

According to the present invention, I subject the preliminarily crushed and dried clay to a further treatment such as an impacting or rubbing treatment to separate the clay adhering to the grit. This further impacting or rubbing treatment can be carried out in suitable apparatus such as a cage mill or disintegrator, or a tube mill loaded with pebbles large enough to rub the clay pellets to powder when rolling over and over each other, but too small and light to crush the intermixed silica or grit particles which are set free from adhering clay and are kept intact for later separation. A cage mill is composed of a series of concentric, circular cages comprising circular rows of rods suitably spaced and parallel to the axis of rotation. Alternate cages rotate in opposite directions and at high velocity. The material which is to be disintegrated is fed into the center and is driven toward the outside shell by centrifugal force. However, in its passage from the center to the outside it is buffeted first in one directon and then in the other by the bars of alternating cages. This buffeting knocks off from the pellets fine particles of clay but is not sufficient to break down the particles of grit.

It will be appreciated that the grit admixed with the clay is itself in a finely divided state. In one sample, for example, the isolated grit was of such a fineness that practically all of it passed through a 10 mesh screen and around 80% of it passed through a 60 mesh screen, while none of it passed through a 325 mesh screen. When the clay is subjected to a preliminary disintegration, the grit-bearing clay is largely separated into pellets. Apparently the clay immediately adjacent to a particle of grit is denser or more adherent than other clay. In any event, the preliminary crushing of the clay sets free a large part of the clay in practically its ultimate state of subdivision or in such a condition that it is sufficiently fine for marketing without further grinding, while the grit content of the clay is largely or entirely present in the form of pellets containing apparently more adherent clay associated with grit particles.

In the present process, this preliminary rough crushing which sets free a large part of the clay in a sufficiently finely divided form and leaves a considerable part of it, amounting in some cases to as much as half or more, in the form of grit-bearing pellets, is subjected after drying to a further disintegration which will set free a large part of the clay from the grit-bearing pellets, leaving the heavier grit-bearing pellets themselves in an uncrushed and undisintegrated condition. The entire body of clay is then subjected to a selective air separation treatment.

The air separation treatment which is employed in the process of the present invention is one which can be carried out rapidly and continuously with a large through-put of clay handled and of fine clay produced. I accomplish this selective air separation by using selective currents of air in separators such as the Gayco type or the Sturtevant selective type of separator. The Gayco separator is a dry centrifugal separator with air currents which enable a large through-put of clay to be handled in them and to accomplish a selective separation of the fine clay particles from the heavier grit particles.

This single air separation treatment enables around 80%, more or less, of clay to be directly obtained in a finely divided and substantially grit-free condition which is directly marketable as commercial clay, commercially free from silica or other objectionable gritty matter.

After this separation there will remain a varying amount, for example, around 20%, more or less, of grit-bearing clay which contains substantially all of the grit particles together with the clay residue which is not separated by the selective air separation treatment. This residue I subject to a further grinding treatment which will completely pulverize both the gritty matter and the clay residue into an impalpable powder which is usable as an inferior product, or for purposes where a gritty clay is desired. This final grinding treatment can be carried out for example, in a Raymond mill or in other suitable mills. The product will contain a large amount of grit reduced to an impalpable powder. Such finely divided mixture of grit and clay can be used, for example, for certain paints where a rough finish is desired.

The present process can be carried out in a continuous manner, with continuous crushing of the air dried clay, continuous drying of the crushed clay in a rotary or other drier, continuous further crushing of the resulting dried clay and continuous feeding of the clay to the selective air separator and continuous selective separation of the fine clay in a substantially grit-free condition from the gritty residue. The selective air separation treatment comprises gentle air flotation and is distinguished from an air blast separation and is of a selective character such as is accomplished in separators of the type above mentioned, e. g., the Gayco dry centrifugal separator or the Sturtevant selective type of separator.

It will thus be seen that the present process is one of marked simplicity, and one in which a single selective air separation treatment is relied upon to separate most of the clay in a finely divided and, substantially grit-free condition from the gritty residue. It will further be seen that the process is one in which there is a two-stage crushing, in the first stage of which the air dried clay is crushed to set free a large part of the clay in the form of finely divided clay together with a large part of the clay in the form of grit-bearing pellets, and in the second stage of which the grit-bearing pellets are themselves further broken down to set free the adhering clay from the grit particles. Both of these crushing operations precede the selective air separation, and the drying of the clay is combined to insure that the clay when finally crushed in a regulated manner is then directly separable into fine clay and a gritty residue, with the greater part of the clay thus directly recovered in a substantially grit-free condition.

I claim:—

1. The method of treating clay, which comprises subjecting clay comprising grit of substantially imperceptible fineness to successive regulated disintegrating operations, with drying of the clay to give a dried and pulverized clay containing the individual grit particles substantially unbroken condition and containing practically all of the clay physically separated from the fine grit particles, and subjecting such clay to recover the fine clay particles substantially free of such fine grit.

2. The further improvement in the process of claim 1 in which the gritty residue from which the finely divided and substantially grit-free clay is separated, is subjected to a further grinding operation to grind the grit into fine particles and to give a fine grit-bearing clay product.

3. The process according to claim 1 in which a two-stage regulated crushing operation is employed and in which the first stage is preceded by air drying and the second stage by a further drying to give a dried product of low moisture content.

4. The method of treating clay, which comprises subjecting clay comprising grit of substantially imperceptible fineness in the form of lumps to air drying, subjecting the air dried clay to a regulated crushing to separate a large part of the clay in a finely divided form from grit-bearing pellets of clay, drying the thus crushed clay, subjecting the dried clay to a further disintegrating treatment to separate the grit and clay from the grit-bearing pellets, and subjecting the resulting dried and disintegrated clay to gentle air flotation to separate directly from the grit a large part of the clay in a finely divided state and substantially free of the fine grit, leaving a grit-bearing residue.

5. The method of producing an impalpable pulverized clay substantially free from grit which comprises subjecting clay comprising grit of substantially imperceptible fineness as mined to a preliminary drying treatment and to a preliminary disintegrating treatment whereby to produce a dry, partially disintegrated clay product, subjecting the product thus obtained to a mechanical action sufficient to separate aggregated clay particles but insufficient to break particles of grit and thereafter subjecting the material thus disintegrated to a gentle current of air at velocity sufficient to hold in suspension a substantial proportion of the clay particles which are of the desired degree of fineness but insufficient to hold in suspension any substantial proportion of the fine grit particles associated therewith, permitting the fine grit particles to separate from the air current and thereafter separating from the air suspension the fine clay substantially free from the fine grit.

6. The method as defined in claim 5, in which the final disintegration treatment is effected by repeatedly throwing the pellets containing aggregated clay particles against each other and against hard surfaces at a velocity adapted to cause detrition of the clay particles from the pellets but insufficient to break the grit particles.

7. The method of treating clay comprising grit of susbtantially imperceptible fineness which comprises subjecting such clay to a preliminary drying and disintegration and subjecting the resultant clay to gentle air flotation to separate the clay from the fine grit and recovering the fine clay particles substantially free of such fine grit.

In testimony whereof I affix my signature.

WILLIAM H. ALTON.